(12) United States Patent
Hartman (10) Patent No.: US 10,222,970 B2
(45) Date of Patent: Mar. 5, 2019

(54) SELECTING AND PERFORMING CONTEXTUAL ACTIONS VIA USER INTERFACE OBJECTS

(71) Applicant: PERINOTE LLC, Seattle, WA (US)

(72) Inventor: Peri Hartman, Seattle, WA (US)

(73) Assignee: PERINOTE LLC, Seattle, WA (US)

( * ) Notice: Subject to any disclaimer, the term of this patent is extended or adjusted under 35 U.S.C. 154(b) by 0 days.

(21) Appl. No.: 15/677,839

(22) Filed: Aug. 15, 2017

(65) Prior Publication Data

US 2017/0344214 A1 Nov. 30, 2017

Related U.S. Application Data

(63) Continuation of application No. 15/480,146, filed on Apr. 5, 2017.
(Continued)

(51) Int. Cl.
*G06F 17/30* (2006.01)
*G06F 3/0482* (2013.01)
(Continued)

(52) U.S. Cl.
CPC .......... *G06F 3/0486* (2013.01); *G06F 3/0482* (2013.01); *G06F 3/04883* (2013.01);
(Continued)

(58) Field of Classification Search
CPC ...... G06F 3/0482; G06F 3/0486; G06F 3/017; G06F 17/30115; G06F 17/30126
(Continued)

(56) References Cited

U.S. PATENT DOCUMENTS 5,630,080 A * 5/1997 Malamud .............. G06F 3/0486
715/769
6,807,668 B2 * 10/2004 Stern ..................... G06F 9/4443
715/769
(Continued)

FOREIGN PATENT DOCUMENTS

EP 2 068 236 A1 6/2009
WO 2004/044781 A2 5/2004

OTHER PUBLICATIONS

Hartman, "Accelerated Panning of Large User Interface Objects," U.S. Appl. No. 15/677,834, filed Aug. 15, 2017, 54 pages.
(Continued)

*Primary Examiner* — Nicholas Ulrich
(74) *Attorney, Agent, or Firm* — Cozen O'Connor (57) ABSTRACT

During a drag operation, commonly known as "drag and drop," the processor causes display a separate graphical indicator or "drop socket" for each action available to a user at the current moment. For example, if the user is viewing a list of objects and selects one source object, if there is only one action possible for the selected receiving object, one drop socket is displayed. If there were two actions possible, then two drop sockets are displayed. The user completes the drag and drop operation by moving the finger or mouse pointer into the graphical region of the drop socket and deselecting or letting up. The specific action performed depends on which drop socket was selected. If the user selects not to complete the drag and drop operation, he simply lets up the finger outside the regions of the drop sockets.

19 Claims, 7 Drawing Sheets

Related U.S. Application Data (60) Provisional application No. 62/333,208, filed on May 7, 2016.

(51) Int. Cl.
*G06F 3/0486* (2013.01)
*G06F 3/0488* (2013.01)

(52) U.S. Cl.
CPC .... *G06F 3/04886* (2013.01); *G06F 17/30115* (2013.01); *G06F 2203/04803* (2013.01)

(58) Field of Classification Search
USPC .................................. 715/825, 769, 732, 808
See application file for complete search history.

(56) References Cited

U.S. PATENT DOCUMENTS

| | | |
|---|---|---|
| 8,161,371 B2 | 4/2012 | Baldwin et al. |
| 8,584,022 B1 | 11/2013 | O'Shaughnessy et al. |
| 8,775,476 B2 | 7/2014 | Henderson |
| 8,812,439 B2 | 8/2014 | King et al. |
| 8,904,306 B1 | 12/2014 | Whitney et al. |
| 8,935,254 B2 | 1/2015 | Hartman |
| 9,021,386 B1 | 4/2015 | Rasmussen et al. |
| 2003/0227487 A1 | 12/2003 | Hugh |
| 2004/0117727 A1 | 6/2004 | Wada |
| 2005/0027797 A1 | 2/2005 | San Andres et al. |
| 2005/0050537 A1 | 3/2005 | Thompson et al. |
| 2005/0228801 A1 | 10/2005 | Peters et al. |
| 2007/0061307 A1 | 3/2007 | Hartwell et al. |
| 2007/0061308 A1 | 3/2007 | Hartwell et al. |
| 2007/0146393 A1* | 6/2007 | Feldman ............... G06F 3/0481 345/660 |
| 2007/0150834 A1* | 6/2007 | Muller ................ G06F 3/04817 715/810 |
| 2007/0299867 A1 | 12/2007 | Baldwin et al. |
| 2008/0040126 A1 | 2/2008 | Estrada et al. |
| 2008/0040690 A1 | 2/2008 | Sakai |
| 2008/0055354 A1 | 3/2008 | Miyazaki |
| 2008/0082561 A1 | 4/2008 | Dere |
| 2008/0183713 A1 | 7/2008 | Al-Attas et al. |
| 2009/0128500 A1 | 5/2009 | Sinclair |
| 2009/0171897 A1 | 7/2009 | Spinola et al. |
| 2009/0171931 A1 | 7/2009 | Avitzur et al. |
| 2009/0172603 A1 | 7/2009 | Young Suk Lee |
| 2010/0082534 A1 | 4/2010 | Sagar et al. |
| 2010/0122194 A1* | 5/2010 | Rogers ............... G06F 3/04817 715/769 |
| 2010/0169853 A1 | 7/2010 | Jain et al. |
| 2010/0269038 A1 | 10/2010 | Tsuda |
| 2011/0025720 A1 | 2/2011 | Jo et al. |
| 2011/0078016 A1 | 3/2011 | Wagenblatt et al. |
| 2011/0106846 A1 | 5/2011 | Matsumoto et al. |
| 2011/0229518 A1 | 9/2011 | Fomsgaard et al. |
| 2011/0264725 A1 | 10/2011 | Haeberle et al. |
| 2012/0143931 A1 | 6/2012 | Rosenberger et al. |
| 2012/0174040 A1 | 7/2012 | Chen et al. |
| 2012/0246115 A1 | 9/2012 | King et al. |
| 2014/0075314 A1* | 3/2014 | Bachman .............. G06F 3/0486 715/716 |
| 2015/0121298 A1 | 4/2015 | Ma |
| 2017/0060378 A1 | 3/2017 | Hartman |
| 2017/0322696 A1 | 11/2017 | Hartman |

OTHER PUBLICATIONS

Hartman, "Method and Apparatus for Accelerated Panning of Large Objects," U.S. Appl. No. 62/333,206, filed May 7, 2016, 16 pages.
Hartman, "Method and Apparatus for an Incremental Spinner," U.S. Appl. No. 62/209,165, filed Aug. 24, 2015, 16 pages.
Hartman, "System and Method for Text Handle Behavior," U.S. Appl. No. 62/333,210, filed May 7, 2016, 11 pages.
International Search Report and Written Opinion, dated Apr. 22, 2014, for International Application No. PCT/US2013/078548, 11 pages.
Hartman, "Method for Selecting and Performing Contextual Actions Using Digital Objects," U.S. Appl. No. 62/333,208, filed May 7, 2016, 23 pages.

* cited by examiner

SELECTING AND PERFORMING CONTEXTUAL ACTIONS VIA USER INTERFACE OBJECTS

TECHNICAL FIELD

The present disclosure relates to apparatus, systems, methods and techniques that employ or implement user interfaces on touch enabled electronic devices, such as tablets, mobile phones, or other touch enabled displays.

BRIEF SUMMARY

As used herein and in the claims, the term "object representation" means a graphical representation (i.e., a virtual object, virtual element or icon) of an object (e.g., file, folder, data object, data structure or other digital or electronically stored information) on a display. As used herein and in the claims, the term "drag operation", means selecting an object representation, and dragging the object representation (e.g., icon) or an indicator (e.g., cross hairs, ghost icon) in a continuous move without releasing the selection, and ending the drag operation by releasing the selection of the object representation. For example, when employing a touch-screen or touch-sensitive display, a drag operation can be implemented by touching a portion of the touch-screen or touch-sensitive display at a location where the object representation appears with a finger or stylus, then moving the finger or stylus to another location while maintaining contact with the touch-screen or touch-sensitive display and, finally, at some later time, removing the finger or stylus from contact with the touch-screen or touch-sensitive display to deselect, release or drop the object representation, thereby ending the drag operation. Also, for example, when employing a mouse or trackball, a drag operation can be implemented by positioning a cursor at a location where the object representation appears and activating (e.g., pressing or holding) a button or key on the mouse or trackball, then moving the cursor to another location while continually actuating the button or key, and finally, at some later point, deactivating (e.g., releasing) the button or key to deselect, release or drop the object representation, thereby ending the drag operation. Thus, the various approaches described herein can be used with a finger on a touch-enabled display, but are not limited to such, and can be used with a stylus or even other pointing mechanisms, for instance a computer mouse or trackball to name a few.

As used herein and in the claims, the terms "letting up" and "lets up" mean, in the case of a touch-screen or touch-sensitive display, removing a finger or stylus from contact with the display. As used herein and in the claims, the terms "letting up" and "lets up" mean, in the case of a computer mouse or trackball, deactivating, releasing or otherwise disengaging a button on the computer mouse or trackball. It is noted that the approaches described herein can be employed with any of a wide variety of computing devices, for example, mobile or smartphones, tablet computers, desktop computers, laptop computers, wearable computers, and embedded computers (e.g., in cars or appliances), and apply to both touch-enabled displays and non-touch-enabled displays.

As used herein and in the claims, the term "drag operation" means selecting some object representation which appears at a first position on a display, and moving the object representation to a second position on the display. The drag operation is typically implemented by selecting the object representation via a pointer, dragging the object representation with the pointer along the display without deselecting (e.g., letting up) the object representation until the object representation is in a desired location. As used herein and in the claims, the term "drag and drop operation" means selecting some object representation which appears at a first position on a display, moving the object representation to a second position on the display, and then deselecting (e.g., releasing, letting up, dropping) the object representation to "drop" the object representation at the desired location.

In some instances, a first or "source" object representation may be dragged to, and dropped on, a second or "receiving" object representation. In response to the dropping of the first or source object representation on the second or receiving object representation, an action associated with or represented by the second or receiving object representation will be performed, if possible, using information associated with or represented by the first or source object representation.

A significant problem occurs when multiple resulting actions are possible in response to dragging and dropping a given source object representation on a given receiving object representation. In such implementations, it is not evident to the end user that there are multiple possible actions associated with the receiving object representation, and it may take an extra step for the end user to choose an action. For example, if a user drags a first icon representing a file from one window to another window, where each window represents a respective folder of various files, there will be no indication to the user as to whether the file represented by the first icon will be moved or copied to the respective folder. For instance, only after the user finishes the drag and drop operation will a menu appear that allows the user to choose whether to complete the action as a "move" or a "copy" of the file to the respective folder. Alternatively, instead of presenting a menu, a default action may be completed, without any notification of which action was performed.

Conventionally, while selecting (e.g., clicking on) and dragging a source object, the source object is represented as a graphical element (i.e., source object representation, e.g., icon) to the end user and moves synchronously with the pointer (e.g., finger of end user, stylus) while dragging the source object representation. An appearance of the graphical element (i.e., source object representation) changes depending on whether the current receiving object can or cannot receive or act upon the particular source object. This may be a particular problem on touch-responsive displays since the user's finger obfuscates the graphical element (i.e., source object representation, e.g., icon), and it is difficult for the end user to see if the visual appearance of the graphical element indicates whether the receiving object can or cannot receive or act upon the source object at the desired moment.

A further problem with conventional approaches is that the finger of the end user may obfuscate the receiving object representation. In situations where there are several receiving object representations in close proximity, this obfuscation makes it difficult for the end user to see whether the desired receiving object will be selected just prior to dropping the source object representation on the receiving object representation.

The approaches described herein are generally executable on processor-based devices, for example a mobile or smartphone, tablet computer, or other processor-based devices including those with touch-enabled or touch-sensitive or touch-responsive displays or screen. The approaches may, for example, satisfy the need of an end user to select a source object and perform a contextually appropriate action with that source object and a selected receiving object. The approaches described herein employ "drop sockets" to implement end actions of drag and drop operations. The approaches use zero or more "drop sockets" to present to the user a clear visual indication on the display screen of what types of actions involving the source object are possible, for example continually while dragging a source object representation or an indicator (e.g., cross hairs, ghost icon) that represents a position of a pointer with which the source object representation was selected, advantageously allowing the end user to complete a desired action without any additional steps. Each drop socket can, for example, take the form of a graphical representation of a specific action available to be selected by the end user at that instance, in the context of the current situation (e.g., which source object, which receiving object, relative positions). A plurality of drop sockets can be presented at any given instance. If no actions are available involving the selected source object at a particular instance, no drop sockets are presented during that time.

A typical drag operation begins when the user selects the source object representation (e.g., an icon), for example via a pointer (e.g., finger, cursor, stylus). While maintaining selection of the source object representation (e.g., without releasing or letting up), the user selects a receiving object by moving the pointer (e.g., dragging finger, moving cursor or stylus) into the vicinity of the desired receiving object representation. The drag operation can be visually represented by movement of an icon that represents a source object, or by movement of an indicator (e.g., cross hairs, ghost icon) while the icon that represents the source object remains stationary. When the source object representation or indicator (e.g., cross hairs, ghost icon) is in the vicinity of the selected receiving object representation, zero, one, or more drop sockets appear, each graphically intersecting with or fully encompassed within a boundary of the selected receiving object representation. The drop sockets preferably do not intersect or overlap each other. The total number of drop sockets that are presented depends at least in part on whether or how many actions are possible between the selected source object and selected receiving object.

To select an action, an end user moves the pointer (e.g., drags his finger, moves a cursor, moves a stylus) into a boundary of the desired drop socket. While the pointer is positioned with the boundary of the drop socket, the user deselects or drops the source object representation, for example by releasing or letting up. In response, the selected action is performed by the processor-based device. To not select any action, the end user simply deselects or drops the source object representation while the cursor is outside the boundaries of all drop sockets.

The positions and composition of drop sockets may change during a drag operation. The composition of drop sockets—how many are displayed and what action each represents—depends on the selected source object and currently selected receiving object. The position of the drop sockets depends on the currently selected receiving object; as stated earlier, the drop sockets graphically intersect, or are fully encompassed within, a boundary of the receiving object representation. Thus, as different receiving objects become selected, drop sockets for any prior selected receiving object disappear, and new drop sockets, if any, for the currently selected receiving object appear or are presented.

For example, a computer file may be moved or copied from one computer folder or data structure element to another computer folder or data structure element. The end user begins the drag operation by selecting an object representation of a desired source file in a desired source folder, called the selected source file and selected source folder, respectively. As the user moves the cursor (e.g., drags a finger) over a destination folder representation, the corresponding computer folder becomes the selected receiving folder. In response, one or two drop sockets can, for example, appear: one for completing a "move" action and one for completing a "copy" action. If the end user chooses the "move" drop socket and deselects, releases or drops the selected source file representation while positioned within a boundary of the "move" drop socket, the processor-based device moves the selected source file from the selected source folder to the selected receiving folder. That is, the processor-based device logically associates the selected source file with the selected receiving folder in a data structure stored in a nontransitory processor-readable medium or memory, and the processor-based device logically disassociates the selected source file with the source folder in the data structure stored in the nontransitory processor-readable medium or memory. If the end user chooses the "copy" drop socket and deselects, releases or drops the selected source file representation while positioned within a boundary of the "copy" drop socket, the processor-based device copies the selected source file (i.e., creates a new instance of the selected source file) to the selected receiving folder. That is, the processor-based device logically associates a second instance of the selected source file with the selected receiving folder in a data structure stored in a nontransitory processor-readable medium or memory, and the processor-based device maintains a logical association of the initial instance of the selected source file with the source folder in the data structure stored in the nontransitory processor-readable medium or memory. If the end user deselects, releases or drops the selected source file while outside the respective boundaries of all of the drop sockets, no action will be performed. If the source file cannot be moved or copied to the selected receiving folder, no corresponding drop sockets will appear, although other types of drop sockets may be presented if other suitable actions can be performed.

In the above example each drop socket represents a specific action between a selected source file and selected receiving folder. At every instance it is clear to the end user which action will be performed and it is also clear to the end user if no action will be performed. In a system without drop sockets, when deselecting, releasing or dropping (e.g., letting up) a source object representation, the end user could become confused as to whether the source object (e.g., file) was copied, moved, or neither. In effect, without drop sockets, the end user must know in advance which action, if any, will be performed when the source object representation is deselected, released, or dropped.

A drop socket can also be location sensitive or responsive. For example, a position of a drop socket relative to the receiving object representation can be a factor in what action the drop socket represents. Note that the drop sockets are presented to intersect, or be fully within, a boundary of the selected receiving object representation. A position of a drop socket within or partially within the boundary of the selected receiving object representation can refine the action the corresponding drop socket represents or performs.

For example, consider a list of items. The display screen may present a graphical representation of a list containing several graphical representations of list items. An end user may wish to organize the list items into a desired order. One by one, the end user can select a source list item and move the selected source list item to another location within the list. Using a drag operation, the end user can select a source list item and drag a representation of the selected source list item to the desired location within the list. While dragging, a drop socket is presented, the drop socket showing where the selected source list item will be inserted if the end user selects that corresponding drop socket. As the end user continues to drag, the drop socket will disappear from one location and a new drop socket is presented in another location. In other words, the action associated with the drop socket is not only to move the selected source list item in the list, but to move the selected source list item to a specific location within the list. That specific location is indicated by the location of the drop socket. This is in contrast to the earlier example of moving or copying a file from one folder to another folder. In that example, the positions of the drop socket(s) were not relevant except to the extent of showing with which receiving object the drop sockets were associated.

A combination of these two approaches may be implemented, where there are multiple actions possible for a selected source object and selected receiving object and the actions are position dependent. Expanding on the list-of-items example, consider that the selected source item may be a list item in another list object, or can be some other kind of object all together. As the end user drags the selected source item, two drop sockets may appear in the selected receiving list. One drop socket is operable to move the source item when selected, and one drop socket is operable to copy the source item when selected. As well, the location of the drop sockets within the selected receiving list representation indicates where (i.e., the position) in the receiving list the source item will be copied or moved.

Visual or other feedback may help the end user to know when the cursor (e.g., finger, stylus) is over a drop socket. For example, when the user's finger is over a drop socket, the corresponding drop socket may change color, may change shape, may flash, may be shown with or without some perimeter graphics, or the processor-based device may produce a sound and/or provide tactile (e.g., vibration) or haptic (e.g., sensation of engaging a bump or a recess) feedback.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with processor-based devices and displays for processor-based devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

Those of skill in the art will appreciate that in various implementations certain acts may be omitted and/or additional acts may be added. Those of skill in the art will also appreciate that the illustrated order of acts of a method, processor or algorithm are shown for exemplary purposes only, and may change in various implementations.

Where reference is made herein to a method comprising two or more defined acts, the defined acts can be carried out in any order or simultaneously (except where the context excludes that possibility), and the operation can include one or more other additional acts which are carried out before any of the defined acts, between two of the defined acts, and/or after all the defined acts (except where the context clearly excludes that possibility).

In all the Figures, the end user has already begun a drag operation by selecting a source object representation, for instance via a finger, a stylus, a cursor or other pointer. The Figure shows the drag operation in progress, after the end user has begun the operation but before the end user has deselected, released (e.g., let up) or dropped the source object representation. The source object can be any virtual object that is accessible via one or more drag or drag and drop operations.

Receiving Object is the Drop Socket

Figure 1:
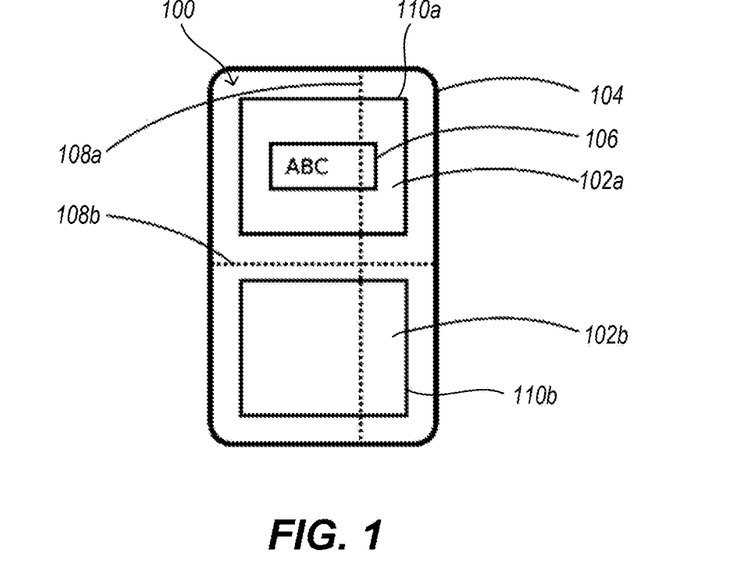
FIG. 1 is a plan view of a touch-responsive display of a processor-based device showing a user interface that includes two container object representations, where each object representation is also a respective drop socket, illustrating an end user performing a drag operation with a pointer (e.g., finger) positioned outside of respective boundaries of the drop sockets.

FIG. 1 shows a user interface 100 that includes two container object representations or virtual elements 102a, 102b which may be displayed, for example, on a touch-enabled, touch-sensitive, or touch-responsive display 104 of a processor-based device, according to at least one illustrated implementation.

Each container object representation 102a, 102b may graphically represent a digital, electronic or virtual element, for example a data element or construction, for instance a folder, a file, etc., which is stored or implemented in nontransitory processor-readable media, for instance one or more digital memories or storage. Each container object representation 102a, 102b is a potential receiving object representation. In this implementation, each container object representation 102a, 102b also constitutes a respective drop socket, which is operable to cause a corresponding action when selected.

In particular, FIG. 1 illustrates an end user performing a drag operation with a source object 106, via selection and movement of a pointer (e.g., finger, stylus, cursor), the position of which is indicated by an indicator, for instance crosshairs 108a, 108b (collectively 108). Notably, in FIG. 1 the pointer is positioned outside of respective boundaries 110a, 110b of both container object representations 102a, 102b and, hence, the drop sockets. Thus, neither container object is selected as a receiving object. Since no object is selected as a receiving object, no action will occur if the user deselects, releases (e.g., lets up) or drops source object 106 at this moment or instance.

The drag operation can be represented as movement of a primary icon or the source object representation, or by movement of the indicator while the primary icon remains stationary. The indicator can, for instance, take the form of cross hairs or a ghost icon that generally resembles the primary icon but has a visual distinction (e.g., transparency) from the primary icon.

Figure 2:
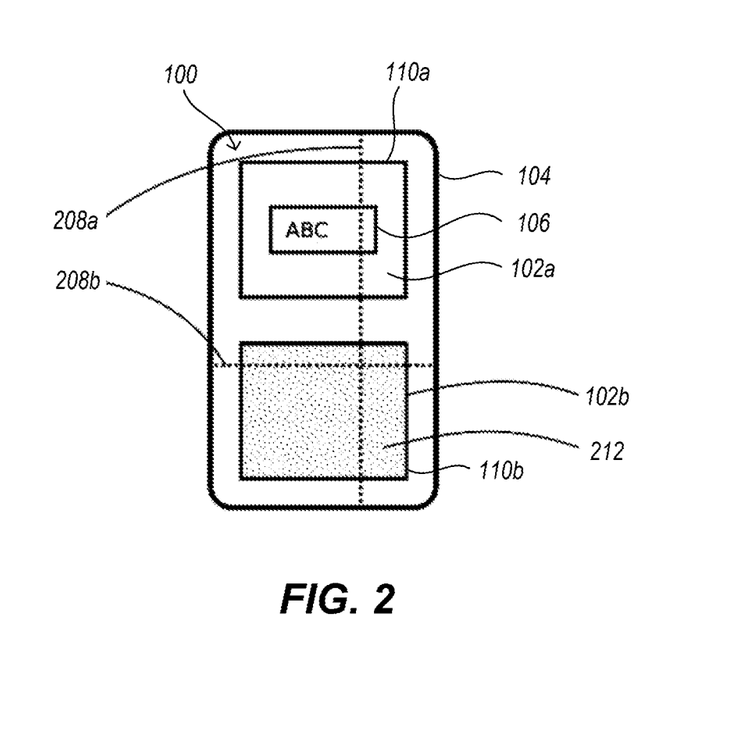
FIG. 2 is a plan view of a touch-responsive display of FIG. 1, illustrating the end user performing the drag operation with the pointer (e.g., finger) positioned inside of the respective boundary of one of the drop sockets.

FIG. 2 shows the user interface 100 of FIG. 1 at a later time. In FIG. 2, the end user has moved the pointer (e.g., finger, stylus, cursor) to a new position within a respective boundary of one of the receiving object representations 102b, the position indicated by crosshairs 208a, 208b (collectively 208). The processor-based device causes a visual notification, for example, via a different background coloring, represented by stippled area 212, that indicates the corresponding action will be performed if the end user deselects, releases (e.g., lets up) or drops the source object 106 at this moment or instance. If the end user moves the pointer (e.g., finger, stylus, cursor) outside the boundary 110b of the receiving object representation 102b without deselecting, releasing or dropping, the processor-based device will revert the receiving object representation to its previous visual appearance, for example unstippled as shown in FIG. 1. The processor-based device can additionally or alternatively produce an aural alert and/or tactile alert in response to the pointer being positioned within a boundary 110a, 110b of the receiving object representation 102a, 102b.

As illustrated, a visual appearance of the receiving object representation 102a, 102b may change, rather than changing the appearance of some indicator under the finger of the user or under a stylus. Many variations are possible, besides visual appearance, to represent the receiving object's state (i.e., selected, not selected), such as showing a border graphic, producing sound, and/or producing haptic feedback. While the Figures employ crosshairs 108, 208 to indicate the position of the pointer, in general any other graphical element (e.g., ring or annulus, ghost icons) may be employed to indicate position. In some implementations, the position of the pointer may not even be visually indicated on the display screen.

Receiving Object has a Distinct Drop Socket

Figure 3:
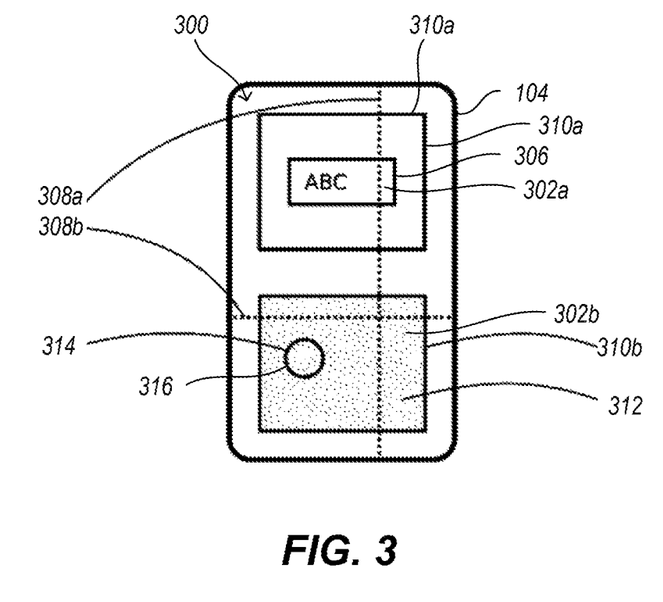
FIG. 3 is a plan view of a touch-responsive display of a processor-based device showing a user interface that includes two container object representations, where one of the object representations is selected and a drop socket appears within a boundary of the selected object representation, illustrating an end user performing a drag operation and a pointer (e.g., finger) positioned outside of a respective boundary of the drop socket.

FIG. 3 shows a user interface 300 that includes two container object representations 302a, 302b which may be displayed, for example, on a touch-enabled, touch-sensitive, or touch-responsive display 104 of a processor-based device, according to at least one illustrated implementation.

Each container object representation 302a, 302b may graphically represent a digital, electronic or virtual element, for example a data element or data construct, for instance a folder, a file, etc., which is stored or implemented in nontransitory processor-readable media, for instance one or more digital memories or storage. Each container object representation 302a, 302b is a potential receiving object representation. In contrast to the implementation of FIGS. 1 and 2, in this implementation neither of the two container object representations 302a, 302b constitute drop sockets, rather the user interface 300 selectively displays one or more distinct drop sockets 314 (only one shown in FIGS. 3 and 4) for the respective receiving object representations 302a, 302b, which are operable to cause corresponding actions when selected.

In particular, FIG. 3 illustrates an end user performing a drag operation with a source object 306, via selection and movement of a pointer (e.g., finger, stylus, cursor), the position of which is indicated by crosshairs 308a, 308b (collectively 308). Notably, in FIG. 3 the pointer is positioned outside of respective boundaries 310a, 310b both container object representations 302a, 302b. Neither container object is selected as a receiving object and, thus, no action will occur if the user deselects, releases (e.g., lets up), or drops source object 306 at this moment or instance.

Notably, in FIG. 3 the end user has moved the pointer, shown by crosshairs 308a, 308b, into the boundary 310a, 310b of one of the receiving object representations 302a, 302b, respectively. The processor-based device has updated a presentation to visually indicate such, for example display the selected receiving object representation with a different background coloring indicated by stippling 312. The processor-based device also updates the presentation to present a drop socket 314 spatially associated (i.e., overlapping, encompassed by) with the selected receiving object representation 302b, indicating that an action involving the object which is represented by the selected receiving object representation 302b can be selected by the end user. Since the pointer is not within a boundary 316 of the drop socket 314, the drop socket 314 is not selected. If the end user were to deselect, release (e.g., let up), or drop the source object representation 306 at this moment or instance, the processor-based device would not perform the action associated with the drop socket 314. If the end user moves the pointer outside the respective boundary 310b of the receiving object representation 302b, without deselecting, releasing (e.g., letting up), or dropping, the processor-based device will cause the drop socket 314 to disappear from the receiving object representation 302b.

Figure 4:
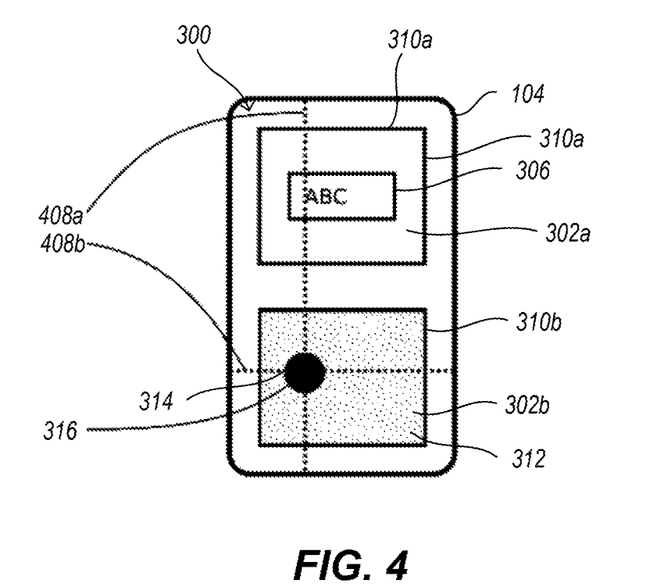
FIG. 4 is a plan view of the touch-responsive display of FIG. 3, illustrating the end user performing the drag operation with the pointer (e.g., finger) positioned inside the respective boundary of the drop socket.

FIG. 4 shows the user interface 300 of FIG. 3 at a later time. In FIG. 4, the end user has moved the pointer (e.g., finger, stylus, cursor) to a new position within a respective boundary 316 of the drop socket 314, the position indicated by crosshairs 408a, 408b. The processor-based device causes a visual notification, for example, via a different visual appearance than in FIG. 3, indicated by solid black within the boundary 316 of the drop socket 314 as illustrated in FIG. 4, to provide feedback to the end user that the pointer is on the drop socket 314. If the end user were to deselect, release or drop at this moment or instance, the processor-based device would perform the action associated with the drop socket 314. If the end user moves the pointer outside the boundary 316 of the drop socket 314 but still within the boundary 310b of the receiving object representation 302b, without deselecting, the processor-based device will revert the drop socket 314 back to its earlier visual appearance, for example as indicated by lack of shading as shown in FIG. 3. The processor-based device would not perform the action associated with the drop socket action 314 if the user deselects, releases or drops at this moment or instance.

Because this embodiment has a drop socket 314 which is distinct from the receiving object representation 302a, 302b, it is possible for the end user to have his finger or stylus overlying the receiving object representation 302a, 302b without the danger of accidentally deselecting, releasing or dropping and invoking the action of the drop socket 314. The end user must actually move the pointer into the boundary 316 of the drop socket 314 and deselect, release (e.g., let up), or drop while the pointer is within the boundary 316 of the drop socket 314 to invoke the action of the drop socket 314. In general, besides changing a visual appearance of the drop socket 314, other notifications are possible to indicate a state of the drop socket 314 (e.g., selected, not selected), such as visually presenting a border graphic, producing sound, or producing haptic feedback.

Location-Sensitive Drop Socket

Figure 5:
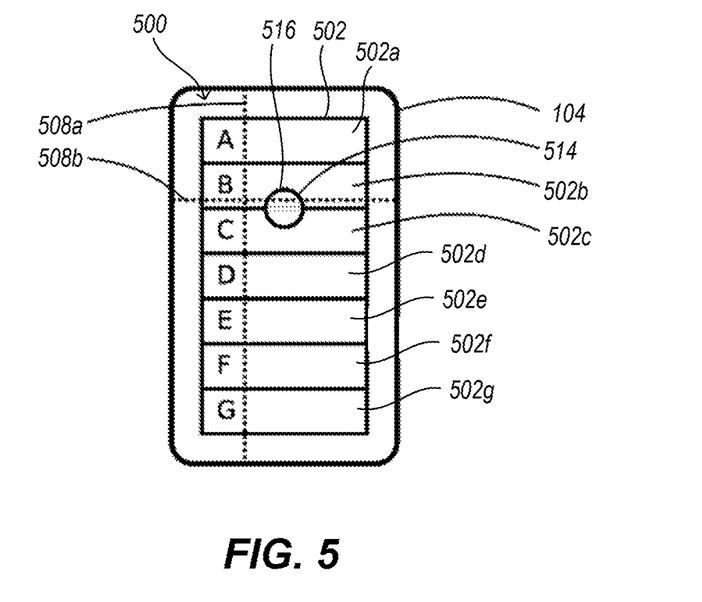
FIG. 5 is a plan view of a touch-responsive display of a processor-based device showing a user interface that includes a list representation containing item representations numbered A through G, illustrating an end user performing a drag operation relative to a location sensitive drop socket positioned between items B and C in the list representation, with a pointer (e.g., finger) positioned outside of a respective boundary of the location sensitive drop socket.
Figure 6:
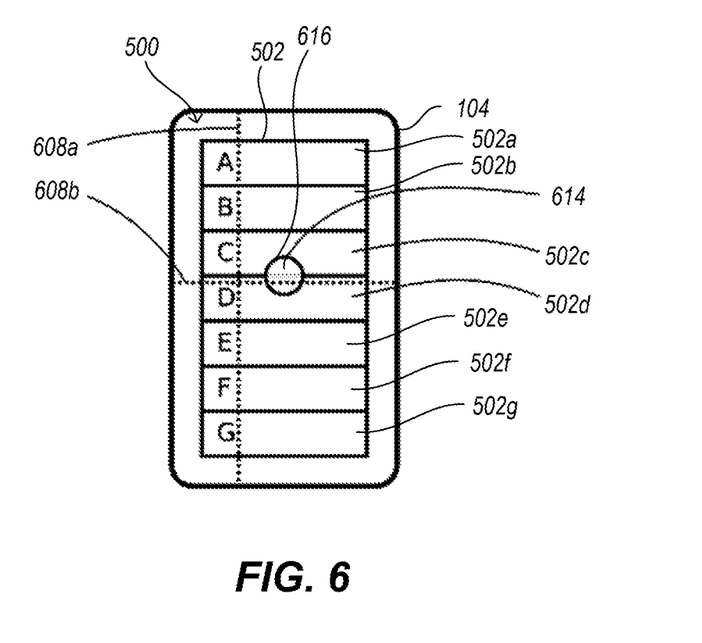
FIG. 6 is a plan view of the touch-responsive display of FIG. 5, illustrating an end user performing a drag operation relative to a location sensitive drop socket positioned between items C and D in the list representation, with the pointer (e.g., finger) positioned outside of the respective boundary of the location sensitive drop socket.

FIG. 5 shows a user interface 500 that includes a representation of a list of items 502a-502g (seven items shown, list collectively referenced as 502) which may be displayed, for example, on a touch-enabled, touch-sensitive, or touch-responsive display screen 104 of a processor-based device, according to at least one illustrated implementation. FIGS. 5 and 6 depict different drop socket positions, each with a unique action, within the selected receiving object representation (e.g., list of items 502) depending on where a pointer is positioned in a receiving object representation 502.

In particular, FIG. 5 illustrates an end user performing a drag operation with a source object (not illustrated in FIG. 5) via selection and movement of a pointer (e.g., finger, stylus, cursor) in the selected receiving object representation (item 502), that is, within a boundary of the list object representation. The position of the pointer is indicated by crosshairs 508a, 508b. (Unlike the previous illustrations, shading for the selected receiving object is omitted from FIG. 5.) Because the pointer (e.g., finger, stylus, cursor) is nearest to the dividing line between representations of list items B and C 502b, 502c as opposed to any other dividing line or a top or a bottom of the list representation 502, the processor-based device presents a drop socket 514 centered between representations of list items B and C 502b, 502c. Since the pointer is not within a boundary 516 of the drop socket 514, the drop socket 514 is not selected. If the end user were to deselect, release (e.g., let up), or drop at this moment or instance, the processor-based device would not perform the action associated with the drop socket 514.

FIG. 6 shows the user interface 500 of FIG. 5 at a later time. In FIG. 6, the end user has moved the pointer (e.g. finger, stylus, cursor) downward, until the pointer is nearest to the dividing line between representations of list items C and D 502c, 502d as opposed to any other dividing line or the top or bottom of the list representation 502. The new position is shown by crosshairs 608a, 608b. In response, the processor-based device presents a drop socket 614 centered between the representations of list items C and D 502c, 502d, and no longer between the representations of list items B and C 502b, 502c (FIG. 5). Since the pointer is not within a respective boundary 616 of the drop socket 614, the drop socket 614 is not selected. If the end user were to deselect, release (e.g., let up), or drop at this moment or instance, the processor-based device would not perform the action associated with the drop socket 614. In general, a drop socket could be presented to appear centered on the dividing line closest to the pointer or centered on a top or a bottom border of the list representation if the pointer is closer to the top or bottom border, respectively, than any dividing line.

Figure 7:
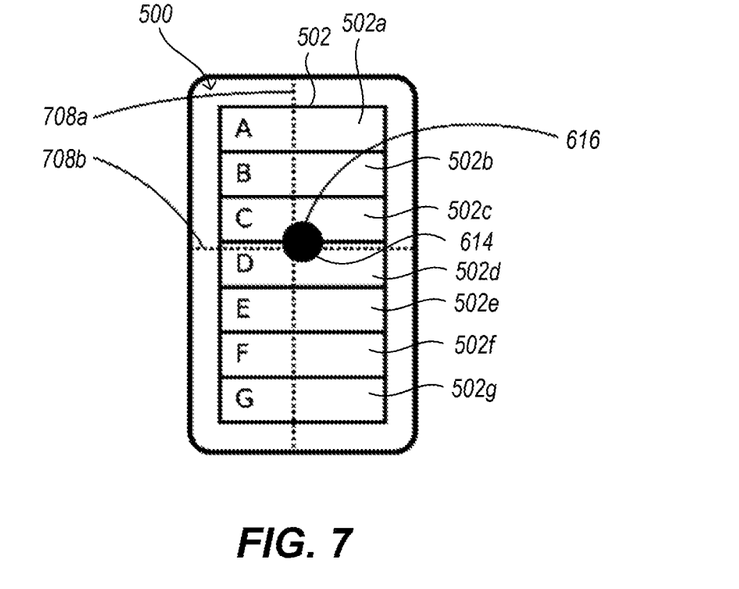
FIG. 7 is a plan view of the touch-responsive display of FIG. 6, illustrating the end user is performing the drag operation, with the pointer (e.g., finger) positioned inside a boundary of the location sensitive drop socket.

FIG. 7 shows the user interface 500 of FIG. 5 at an even later time. In FIG. 7, the end user has moved the pointer (e.g., finger, stylus, cursor) to be positioned within a boundary 616 of the drop socket 614. The new position is indicated by crosshairs 708a, 708b. In response, the processor-based device updates a visual appearance of the drop socket 614 as compared to that illustrated in FIG. 6, e.g., illustrated in solid black, to provide feedback to the end user that the pointer is over the drop socket 614. If the end user were to deselect, release (e.g., let up), or drop at this moment or instance, the processor-based device would perform the action represented by the drop socket 614: for example inserting the source object (not illustrated in FIG. 7) between list items C and D 502*c*, 502*d* in the list representation 502. If the end user moves the pointer outside the boundary 616 of the drop socket 614 but still remains closest to the dividing line between the representations of list items C and D 502*c*, 502*d* without deselecting, releasing or dropping, the processor-based device will revert the appearance of the drop socket 614 to a previous appearance, e.g., an unshaded visual appearance as shown in FIG. 6. Additionally, the processor-based device would not perform the action indicated or represented by the drop socket action 614 if the end user deselects, releases or drops at this moment or instance.

In general, a drop socket action can be to insert an item into a list between other items indicated by the position of the drop socket, or at a top or a bottom of the list if the drop socket is so positioned. The drop socket action is different for each position because it implies inserting a selected source object into a different location in the list depending on each drop socket position.

The approaches described herein are not restricted to inserting an object into a particular location in a list, but can apply to any situation where the resulting action is dependent on a particular location within the selected receiving object. Also, the various approaches can employ source objects that originate from within or outside the selected receiving object. Different algorithms, besides the one described herein, could be used to determine where to position the drop socket or whether to show or not show a drop socket. In general, any of a variety of techniques can be employed to indicate a drop socket's state (e.g., selected, not selected), such as showing a border graphic, producing sound, and/or producing haptic feedback.

Multiple Drop Sockets

Figure 8:
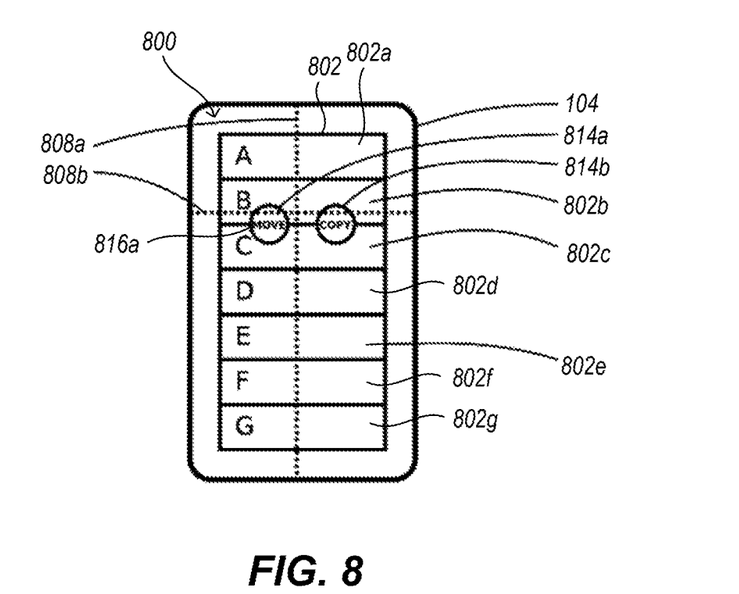
FIG. 8 is a plan view of a touch-responsive display of a processor-based device showing a user interface that includes a list representation containing item representations numbered A through G, illustrating an end user performing a drag operation relative to two location sensitive drop sockets positioned between items B and C of the list representation, with a pointer (e.g., finger) positioned outside of the respective boundaries of the location sensitive drop sockets.

FIG. 8 shows a user interface 800 that includes a representation of a list of items 802*a*-802*g* (seven shown, list collectively referenced as 802) which may be displayed, for example, on a touch-enabled, touch-sensitive, or touch-responsive display screen 104 of a processor-based device, according to at least one illustrated implementation. FIG. 8 depicts two or more drop sockets 814*a*, 814*b* in a selected receiving object, i.e., list representation 802, from which an end user may choose.

In particular, FIG. 8 illustrates an end user performing a drag operation with a source object (not illustrated in FIG. 8) via selection and movement of a pointer (e.g., finger, stylus, cursor) positioned in the selected receiving object representation, e.g., list representation 802. The position of the pointer is indicated by crosshairs 808*a*, 808*b*. Because the pointer (e.g., finger, stylus, cursor) is nearest to the dividing line between representations of list items B and C 802*b*, 802*c*, as opposed to any other dividing line or a top or a bottom of the list representation 802, the processor-based device presents two drop sockets, namely a MOVE drop socket 814*a* and a COPY drop socket 814*b*, respectively, centered between those two list item representations B and C 802*b*, 802*c*. The action associated with these drop sockets 814*a*, 814*b* is dependent at least in part on the respective positions of the drop sockets 814*a*, 814*b* relative to or within the list representation 802. In this case, selection of the actions will cause the processor-based device to move or copy, respectively, the source object (not illustrated in FIG. 8) into the list representation 802 between the list items indicated by the position of the drop sockets 814*a*, 814*b*. Since the pointer is not positioned within the respective boundaries 816*a*, 816*b* of either drop socket 814*a*, 814*b*, neither drop socket 814*a*, 814*b* is selected. If the end user were to deselect, release (e.g., let up), or drop at this moment or instance, the processor-based device would not perform the action associated with the drop sockets 814*a*, 814*b*. Moving a source object representation or indicator to at least partially overlap a link drop socket may cause a processor to add a link or association (e.g., logical association) between the source object represented by the source object representation and another object, for example increasing a number of parents to which the source object is logically linked.

Figure 9:
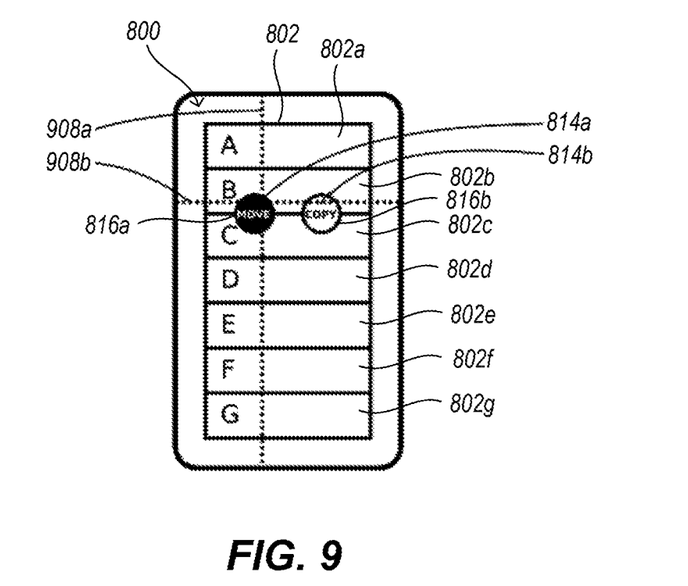
FIG. 9 is a plan view of the touch-responsive display of FIG. 8, illustrating the end user performing the drag operation, with the pointer (e.g., finger) positioned inside a boundary of one of the drop sockets.

FIG. 9 shows the user interface 800 at a later time. In FIG. 9, the end user has moved the pointer (e.g., finger, stylus, cursor) within a boundary 816*a* of the MOVE drop socket 814*a*. The new position is indicated by crosshairs 908*a*, 908*b*. In response, the processor-based device updates a visual appearance of the selected drop socket 814*a* to be a different visual appearance than that of FIG. 8, e.g., illustrated in solid black in FIG. 9, to provide feedback to the end user indicating that the pointer is overlying the selected drop socket 814*a*. If the end user were to deselect, release (e.g., let up), or drop at this moment or instance, the processor-based device would perform the action identified or represented by the selected drop socket 814*a* (e.g., moving the source object), for instance inserting the source object between list items B and C 802*b*, 802*c*, and removing the source object from its current container (not shown in FIG. 9). If the end user moves the pointer (e.g., finger, stylus, cursor) outside the respective boundary 816*a* of the drop socket 814*a* but still remains closest to the dividing line between the representations of list items B and C 802*b*, 802*c* without deselecting, releasing or dropping the source object, the processor-based device will revert the appearance of the drop socket 814*a* to its previous unemphasized (e.g., unshaded) visual appearance, for instance as shown in FIG. 8. Additionally, the processor-based device would not perform the action identified by the drop socket 814*a* if the end user deselected, released (e.g., let up), or dropped at that moment or instance.

If the end user were to deselect, release or drop the source object (not illustrated in FIG. 9) while the pointer is within the boundary 816*b* of the COPY drop socket 814*b*, the processor-based device would perform a corresponding copy action, different from the move action. The processor-based device would copy the source object, for instance, inserting a copy or a second instance of the source object between list items B and C 802*b*, 802*c*, and leaving the original or first instance of the source object in its current container (not shown in FIG. 9).

The described approaches do not impose any limits on how many drop sockets can be available at any moment and the number of drop sockets appearing or being presented might vary depending on circumstances. For example, if a specific implementation permits a source object to be moved only to certain locations in a list, the processor-based device would present a drop socket only for those locations in the list representation, and no drop socket would be presented for other locations. If a specific implementation permits any source object to be copied into a list, but only permits certain types of source objects to be moved into a list, the processor-based device would present both a MOVE drop socket and a COPY drop socket for source objects where the implementation permits a move action, but would present only a COPY drop socket for source objects where a move action is not permitted. Another implementation could present a graphical representation of a jigsaw puzzle, where each selected receiving object would be represented as a respective a puzzle piece, and drop sockets presented for the places the source object (e.g., a new puzzle piece) could be inserted. In general, a wide variety of different types of actions can be logically associated with any of a variety of drop sockets.

Source Object is an Action

Figure 10:
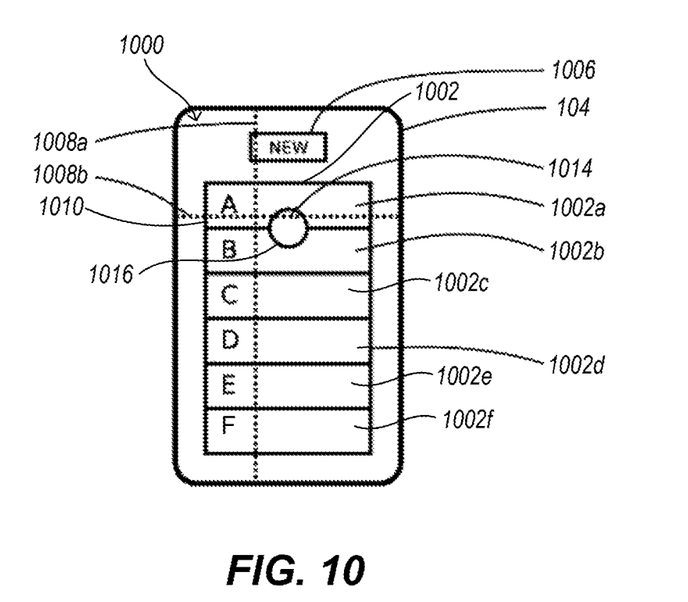
FIG. 10 is a plan view of a touch-responsive display of a processor-based device showing a user interface that includes a list representation containing item representations numbered A through G and a "new" button representation, illustrating an end user performing a drag operation where a source object is the "new" button representation and a location sensitive drop socket is positioned between items A and B, with the pointer (e.g., finger) positioned outside of a boundary of the location sensitive drop socket.

FIG. 10 shows a user interface 1000 which includes a representation of a list of items 1002a-1002f (six items shown, list collectively referenced as 1002) and a "new" button representation 1006 which may be displayed, for example, on a touch-enabled, touch-sensitive, or touch-responsive display screen 104 of a processor-based device, according to at least one illustrated implementation. FIG. 10 depicts source object representation 1006 as an action rather than an object to be manipulated.

In particular, FIG. 10 illustrates an end user performing a drag operation via selection and movement of a pointer (e.g., finger, stylus, cursor), where the source object is the "new" button 1006 and the pointer position is within a boundary 1010 of a selected receiving object representation 1002. The position is indicated by crosshairs 1008a, 1008b. Since the pointer is nearest to the dividing line between representations of list items A and B 1002a, 1002b, as opposed to any other dividing line or a top or a bottom of the list representation 1002, the processor-based device causes presentation of a drop socket 1014 centered between representations of list items A and B 1002a, 1002b. Since the pointer is not within the boundary 1016 of the drop socket 1014, the drop socket 1014 is not selected. Thus, if the end user were to deselect, release (e.g., let up), or drop the source object 1006 at this moment or instance, the processor-based device would not perform the action indicated by or associated with the drop socket 1014.

If the end user moves the pointer within the boundary 1016 of the drop socket 1014, the processor-based device will update a visual appearance of the drop socket 1014, indicating that an action identified by or associated with the respective drop socket 1014 would be performed if the user deselects, releases or drops the source object 1006 at that moment or instance. The action indicated by or associated with the drop socket 1014 may, for example, be to insert a new item into the list representation 1002 at the current position of the drop socket 1014, for instance between list items A and B 1002a, 1002b.

In general in this implementation, the position of the drop socket 1014 will depend on the position or location of the pointer (e.g., finger, stylus, cursor) with respect to or within the list item representation 1002 as described in reference to other implementations. The action associated with or identified by the drop socket 1014 may change depending on the position of the drop socket 1014. In particular, the action will change to insert a new item at a top or a bottom of the list representation 1002 or between any two of list items 1002a-1002f as indicated by the position of the drop socket 1014.

Source Object as Action with Multiple Drop Sockets

Figure 11:
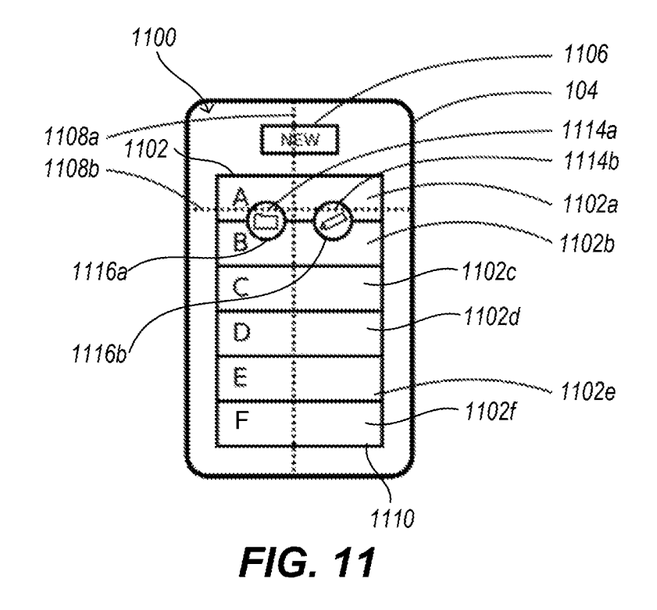
FIG. 11 is a plan view of a touch-responsive display of a processor-based device showing a user interface that includes a list representation containing item representations numbered A through G and a "new" button representation, illustrating an end user performing a drag operation where the source object is the "new" button and two location sensitive drop socket are positioned between items A and G, with a pointer (e.g., finger) positioned outside of the respective boundaries of the drop sockets.

FIG. 11 shows a user interface 1100 including a representation of a list of items 1102a-1102f (six shown, list collectively referenced as 1102) and a "new" button representation 1106, which may be displayed, for example, on a touch-enabled, touch-sensitive, or touch-responsive display screen 104 of a processor-based device, according to at least one illustrated implementation. FIG. 11 shows a source object 1106 that represents an action, and the end user may select from two or more drop sockets 1114a, 1114b in the selected receiving object representation 1102.

In particular, FIG. 11 illustrates an end user performing a drag operation via selection and movement of a pointer (e.g., finger, stylus, cursor) where the source object is the "new" button 1106 and a pointer position is within a boundary 1110 of a selected receiving object representation 1102. The position of the pointer is indicated by crosshairs 1108a, 1108b. Since the pointer is nearest to the dividing line between representations of list items A and B 1102a, 1102b, as opposed to any other dividing line or a top or a bottom of the list representation 1102, the processor-based device causes a presentation of two drop sockets 1114a, 1114b centered between the representations of list items A and B 1102a, 1102b. Since the pointer is not within a respective boundary 1116a, 1116b of either drop socket 1114a, 1114b, neither drop socket 1114a, 1114b is selected. Thus, if the end user were to deselect, release (e.g., let up) or drop the source object 1106 at this moment or instance, the processor-based device would not perform the action indicated by or associated with the drop sockets 1114a, 1114b.

As illustrated, action identified or represented by the left drop socket 1114a is to insert a new folder into the list representation 1102 at the indicated position, that is, insert a new folder at a position between list items A and B 1102a, 1102b. The action identified or represented by the right drop socket 1114b is to insert a new note into the list representation 1102 at the indicated position, that is, insert a new note at a position between list items A and B 1102a, 1102b. If the user selects a drop socket 1114a, 1114b by moving the pointer within a respective boundary 1116a, 1116b of the drop socket 1114a, 1114b, the processor-based device will update a visual appearance of the selected drop socket 1114a, 1114b, for instance changing the visual appearance, indicating that the action indicated by the selected drop socket 1114a, 1114b would be performed if the end user deselects, releases or drops the source object 1106 at that moment or instance.

In general in this implementation, the drop socket positions depend on the position or location of the pointer with respect to the list item representations as described previously. The drop socket actions may change depending on the drop socket position. In particular, the actions will change to insert a new folder or a new note, respectively, at the top or bottom of the list or between any two of list items as indicated by the drop socket positions.

The described approaches do not impose any limits on how many drop sockets can be available at any moment and the number of drop sockets appearing might vary depending on circumstances as explained herein. In general, any of a large variety of actions can be indicated by or associated with any of a large variety of drop sockets.

Feedback

In all implementations, any of a variety of feedback could be provided, both for while dragging a source object representation and at the point of dropping, that is, at the point of deselecting or releasing or letting up the user's finger or stylus. During dragging, one form of feedback is to have the drop sockets change color when the end user drags into the drop socket. This feedback serves two purposes. One is to indicate that the pointer is within the boundary of the drop socket and the drop socket action will occur if the end user drops the source object. The other is that, when no drop sockets are providing feedback, no drop socket action will occur when the end user drops the source object. This feedback adds value to the end user's experience. It provides an easy way for the end user to abort the operation and also makes it very clear as to what action to expect at any given moment.

Feedback could also be provided when the end user drops or releases the source object to complete a drag operation. For example, the processor-based device may produce haptic feedback or cause the drop socket appearance to flicker. In this example, if the pointer (e.g., user's finger) drifts out of the boundary of the drop socket before the end user drops the source object, the feedback would not occur, indicating the drop socket action did not occur.

System

Figure 12:
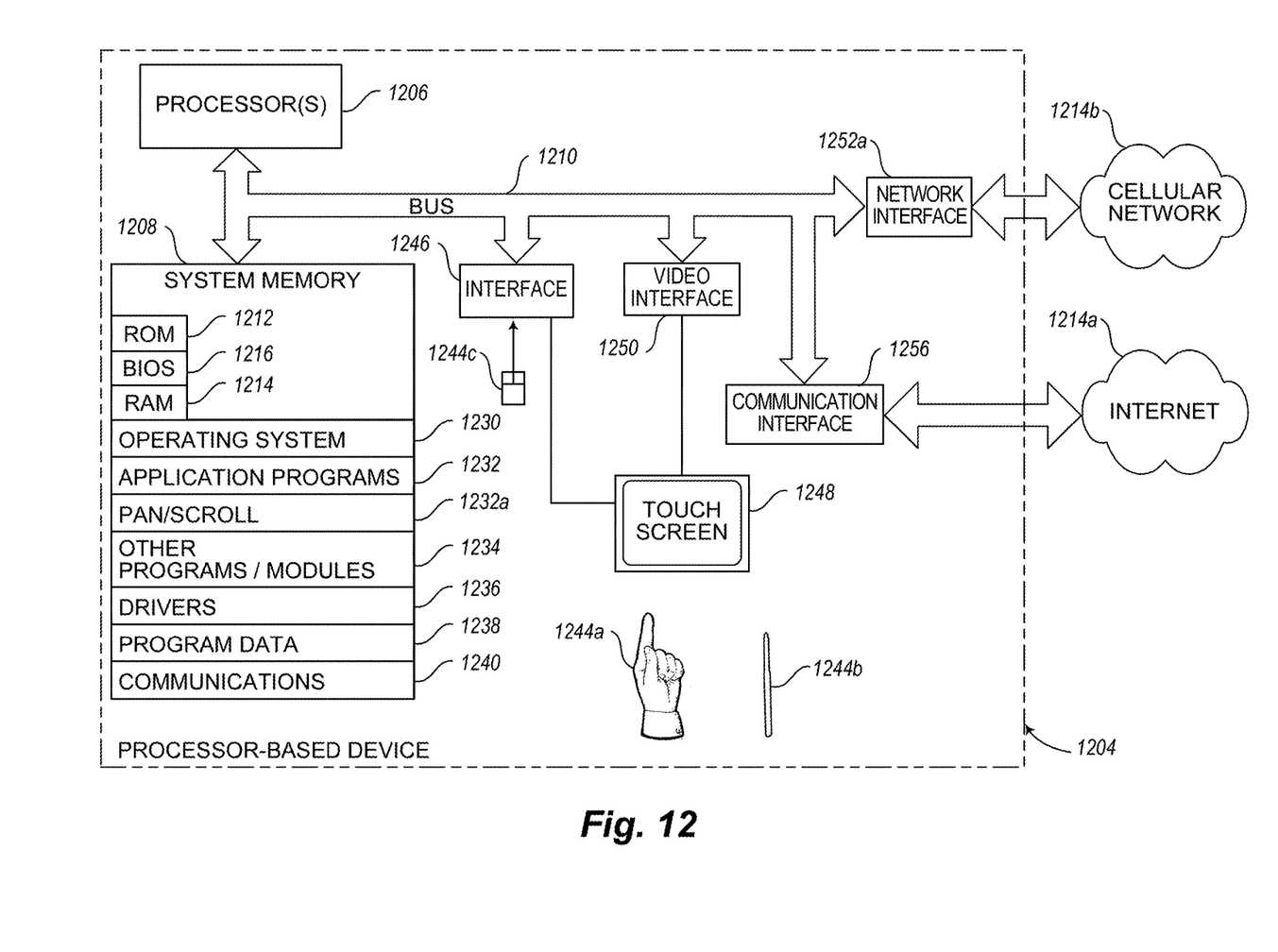
FIG. 12 is a block diagram of an example processor-based device used to implement one or more of the user interface approaches described herein, according to one non-limiting illustrated embodiment.

FIG. 12 shows a processor-based device 1204 suitable for implementing various embodiments described herein. Although not required, some portion of the embodiments will be described in the general context of processor-executable instructions or logic, such as program application modules, objects, or macros being executed by one or more processors. Those skilled in the relevant art will appreciate that the described embodiments, as well as other embodiments, can be practiced with various processor-based system configurations, including handheld devices, such as smartphones and tablet computers, wearable devices, multiprocessor systems, microprocessor-based or programmable consumer electronics, personal computers ("PCs"), network PCs, minicomputers, mainframe computers, and the like.

The processor-based device 1204 may, for example, take the form of a smartphone or tablet computer, which includes one or more processors 1206, a system memory 1208 and a system bus 1210 that couples various system components including the system memory 1208 to the processor(s) 1206. The processor-based device 1204 will at times be referred to in the singular herein, but this is not intended to limit the embodiments to a single system, since in certain embodiments, there will be more than one system or other networked computing device involved. Non-limiting examples of commercially available systems include, but are not limited to, ARM processors from a variety of manufactures, Core microprocessors from Intel Corporation, U.S.A., PowerPC microprocessor from IBM, Sparc microprocessors from Sun Microsystems, Inc., PA-RISC series microprocessors from Hewlett-Packard Company, 68xxx series microprocessors from Motorola Corporation.

The processor(s) 1206 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 12 are of conventional design. As a result, such blocks need not be described in further detail herein, as they will be understood by those skilled in the relevant art.

The system bus 1210 can employ any known bus structures or architectures, including a memory bus with memory controller, a peripheral bus, and a local bus. The system memory 1208 includes read-only memory ("ROM") 1212 and random access memory ("RAM") 1214. A basic input/output system ("BIOS") 1216, which can form part of the ROM 1212, contains basic routines that help transfer information between elements within processor-based device 1204, such as during start-up. Some embodiments may employ separate buses for data, instructions and power.

The processor-based device 1204 may also include one or more solid state memories, for instance Flash memory or solid state drive (SSD) 1218, which provides nonvolatile storage of computer-readable instructions, data structures, program modules and other data for the processor-based device 1204. Although not depicted, the processor-based device 1204 can employ other nontransitory computer- or processor-readable media, for example a hard disk drive, an optical disk drive, or memory card media drive.

Program modules can be stored in the system memory 1208, such as an operating system 1230, one or more application programs 1232, other programs or modules 1234, drivers 1236 and program data 1238.

The application programs 1232 may, for example, include panning/scrolling 1232a. Such panning/scrolling logic may include, but is not limited to logic that determines when and/or where a pointer (e.g., finger, stylus, cursor) enters a user interface element that includes a region having a central portion and at least one margin. Such panning/scrolling logic may include, but is not limited to logic that determines a direction and a rate at which at least one element of the user interface element should appear to move, and causes updating of a display to cause the at least one element to appear to move in the determined direction at the determined rate. The panning/scrolling logic 1232a may, for example, be stored as one or more executable instructions. The panning/scrolling logic 1232a may include processor and/or machine executable logic or instructions to generate user interface objects using data that characterizes movement of a pointer, for example data from a touch-sensitive display or from a computer mouse or trackball, or other user interface device.

The system memory 1208 may also include communications programs 1240, for example a server and/or a Web client or browser for permitting the processor-based device 1204 to access and exchange data with other systems such as user computing systems, Web sites on the Internet, corporate intranets, or other networks as described below. The communications program 1240 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or Web clients or browsers are commercially available such as those from Mozilla Corporation of California and Microsoft of Washington.

While shown in FIG. 12 as being stored in the system memory 1208, the operating system 1230, application programs 1232, other programs/modules 1234, drivers 1236, program data 1238 and server and/or browser 1240 can be stored on any other of a large variety of nontransitory processor-readable media (e.g., hard disk drive, optical disk drive, SSD and/or flash memory.

A user can enter commands and information via a pointer, for example through input devices such as a touch screen 1248 via a finger 1244a, stylus 1244b, or via a computer mouse or trackball 1244c which controls a cursor. Other input devices can include a microphone, joystick, game pad, tablet, scanner, biometric scanning device, etc. These and other input devices (i.e., "I/O devices") are connected to the processor(s) 1206 through an interface 1246 such as a touch-screen controller and/or a universal serial bus ("USB") interface that couples user input to the system bus 1210, although other interfaces such as a parallel port, a game port or a wireless interface or a serial port may be used. The touch screen 1248 can be coupled to the system bus 1210 via a video interface 1250, such as a video adapter to receive image data or image information for display via the touch screen 1248. Although not shown, the processor-based device 1204 can include other output devices, such as speakers, vibrator, haptic actuator or haptic engine, etc.

The processor-based device 104 operates in a networked environment using one or more of the logical connections to communicate with one or more remote computers, servers and/or devices via one or more communications channels, for example, one or more networks 1214a, 1214b. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, the processor-based device 1204 may include one or more network, wired or wireless communications interfaces 1252a, 1256 (e.g., network interface controllers, cellular radios, WI-FI radios, Bluetooth radios) for establishing communications over the network, for instance the Internet 1214a or cellular network.

In a networked environment, program modules, application programs, or data, or portions thereof, can be stored in a server computing system (not shown). Those skilled in the relevant art will recognize that the network connections shown in FIG. 12 are only some examples of ways of establishing communications between computers, and other connections may be used, including wirelessly.

For convenience, the processor(s) 1206, system memory 1208, and network and communications interfaces 1252a, 1256 are illustrated as communicably coupled to each other via the system bus 1210, thereby providing connectivity between the above-described components. In alternative embodiments of the processor-based device 1204, the above-described components may be communicably coupled in a different manner than illustrated in FIG. 12. For example, one or more of the above-described components may be directly coupled to other components, or may be coupled to each other, via intermediary components (not shown). In some embodiments, system bus 1210 is omitted and the components are coupled directly to each other using suitable connections.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other processor-based devices and/or displays associated with processor-based devices, for example touch-sensitive or touch-responsive displays of portable processor-based devices, not necessarily the exemplary processor-based devices generally described above.

For instance, the foregoing detailed description has set forth various embodiments of the systems, devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more processors, for instance one or more Application Specific Integrated Circuits (ASICs). However, those skilled in the art will recognize that the embodiments disclosed herein, in whole or in part, can be equivalently implemented in standard or generic integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units (CPUs), graphical processing units (GPUs), programmable gate arrays (PGAs), programmed logic controllers (PLCs)), as firmware, or as virtually any combination thereof, and that designing the circuitry and/or writing the code for the software and or firmware would be well within the skill of one of ordinary skill in the art in light of the teachings of this disclosure. As used herein and in the claims, the terms processor or processors refer to hardware circuitry, for example ASICs, microprocessors, CPUs, GPUs, PGAs, PLCs, and other microcontrollers.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any hardware that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   causing, by at least one processor, a presentation of a graphical representation of a user interface comprising at least a first source object representation that represents a first source object and a first receiving object representation that represents a first receiving object;
   in response to a first drag operation that drags the first source object representation or an indicator that represents a position of a pointer, the pointer with which the first source object representation was selected, in at least a defined proximity of a location between two successive object representations of a list of object representations, the list comprising a one-dimensional array of object representations arranged along a direction within the first receiving object representation:
      determining, by at least one processor, which, if any, of a number of actions associated with the first receiving object can be performed on the first source object, wherein determining which, if any, of a number of actions associated with the first receiving object can be performed on the first source object includes determining which of a plurality of actions associated with the first receiving object are compatible with the type of object to which the first source object corresponds; and
      for each action it is determined can be performed on the first source object, causing, by at least one processor, a presentation of a respective drop socket spatially at least overlapping or encompassed by the first receiving object representation, each drop socket having a respective boundary and responsive to a deselection of the first source object representation with the first source object representation or indicator at least partially within the respective boundary of the drop socket to cause the respective action to be performed on the first source object.

2. The method of claim 1 wherein the first source object is a first instance of a file type object, the first receiving object is a first instance of a list type object, and the actions include a copy action which creates a second instance of the first source object to the first instance of the list type object.

3. The method of claim 1 wherein the first source object is a first instance of a file type object, the first receiving object is a first instance of a list type object, and the actions include a move action which logically associates the first instance of the first source object to the first instance of the list type object.

4. The method of claim 1 wherein the first source object is a first instance of a file type object, the first receiving object is a first instance of a list type object, and the actions include a move action which changes a logical association of the first instance of the first source object from one list type object to another list type object.

5. The method of claim 1 wherein the actions include a link action which creates an association between the first source object and a third object, in addition to an existing association between the first source object and a second object.

6. The method of claim 1 wherein causing a presentation of a respective drop socket includes causing a presentation of one or more characters or one or more non-character icons that represent the respective action.

7. The method of claim 1, further comprising:
   in response to the deselection of the first source object representation with the first source object representation or indicator at least partially within the respective boundary of a first drop socket, causing the respective action to be performed on the first source object.

8. The method of claim 1 wherein determining which, if any, of a number of actions associated with the first receiving object can be performed on the first source object includes determining which of the plurality of actions associated with the first receiving object are compatible with a current position of a pointer, with which the first source object is being dragged, within a boundary of the first receiving object.

9. The method of claim 1 wherein the number of actions associated with the first receiving object are determined while the drag operation is active.

10. The method of claim 1 wherein the first source object is a file type object, and determining which, if any, of a number of actions associated with the first receiving object can be performed on the first source object includes determining which of a plurality of actions associated with the first receiving object are compatible with the file type objects.

11. The method of claim 1, further comprising:
    in response to the first source object representation or the indicator being positioned at least partially within the first receiving object representation as part of the first drag operation, causing at least one instance of a feedback to be presented.

12. The method of claim 1, wherein a position of each drop socket is determined based at least in part on a position of the first source object or the position of the pointer.

13. The method of claim 1, further comprising:
    in response to a second drag operation that drags the first source object representation or the indicator that represents the position of the pointer, the pointer with which the first source object representation was selected, in at least a defined proximity of a second receiving object representation, the second receiving object representation spaced from the first receiving object representation:
       determining, by the at least one processor, which, if any, of a number of actions associated with the second receiving object can be performed on the first source object; and
       for each action that it is determined can be performed on the first source object, causing, by the at least one processor, a presentation of a respective drop socket spatially at least overlapping or encompassed by the second receiving object representation, each drop socket having a respective boundary and responsive to a deselection of the first source object representation with the first source object representation or the indicator at least partially within the respective boundary of the drop socket to cause the respective action to be performed on the first source object.

14. The method of claim 13, further comprising:
    in response to the second drag operation that drags the first source object representation or the indicator that represents the position of the pointer, the pointer with which the first source object representation was selected, in at least the defined proximity of the second receiving object representation:
       causing the presentation of the respective drop socket spatially at least overlapping or encompassed by the first receiving object representation to stop.

15. The method of claim 1, further comprising:

in response to the first drag operation that drags the first source object representation or the indicator that represents the position of the pointer, the pointer with which the first source object representation was selected, in at least the defined proximity of the first receiving object representation:
- repeatedly determining, by the at least one processor, a current position of a pointer, with which the first source object is being dragged, within a boundary of the first receiving object;
- repeatedly determining, by the at least one processor, a current location within the boundary of the first receiving object or the indicator at which to display at least one drop socket based at least in part on the determined current position of the pointer; and
- repeatedly causing, by the at least one processor, a presentation of the respective drop socket at the determined current location.

16. The method of claim 1 wherein the first receiving object is a first list of a plurality of source object representations, each of which represents a respective source object, and further comprising:

in response to the first drag operation that drags the first source object representation or the indicator in at least the defined proximity of the first receiving object representation:
- repeatedly determining a current position of a pointer, with which the first source object is being dragged, within a boundary of the first list of source object representations;
- repeatedly determining a current location within the boundary of the first list of source object representations at which to display at least one drop socket based at least in part on the determined current position of the pointer; and
- repeatedly causing a presentation of the respective drop socket at the determined current location.

17. The method of claim 16, further comprising:

in response to the deselection of the first source object representation with the first source object representation or the indicator at least partially within the respective boundary of a first drop socket, causing, by the at least one processor, the respective action to be performed on the first source object.

18. The method of claim 16 wherein repeatedly causing a presentation of the respective drop socket at the determined current location includes causing a presentation of both a move action drop socket and a copy action drop socket between two different source object representations in the list of source object representations.

19. A system, comprising:

at least one processor;

at least one processor-readable medium, communicatively coupled to the at least one processor, and that stores at least one of processor-executable instructions or data, which when executed by the at least one processor causes the at least one processor to:
- cause a presentation of a graphical representation of a user interface comprising at least a first source object representation that represents a first source object and a first receiving object representation that represents a first receiving object;
- in response to a first drag operation that drags the first source object representation or an indicator that represents a position of a pointer, the pointer with which the first source object representation was selected, in at least a defined proximity of a location between two successive object representations of a list of object representations, the list comprising a one-dimensional array of object representations arranged along a direction within the first receiving object representation:
  - determine which, if any, of a number of actions associated with the first receiving object can be performed on the first source object, wherein to determine which, if any, of a number of actions associated with the first receiving object can be performed on the first source object the at least one processor determines which of a plurality of actions associated with the first receiving object are compatible with the type of object to which the first source object corresponds; and
  - for each action that it is determined can be performed on the first source object, cause a presentation of a respective drop socket spatially at least overlapping or encompassed by the first receiving object representation, each drop socket having a respective boundary and responsive to a deselection of the first source object representation with the first source object representation or the indicator at least partially within the respective boundary of the drop socket to cause the respective action to be performed on the first source object.

* * * * *